United States Patent
Hild et al.

(10) Patent No.: US 11,575,808 B2
(45) Date of Patent: Feb. 7, 2023

(54) CAMERA TO OBSERVE THE SWITCHED POSITION OF A SWITCH CONTACT

(71) Applicant: Siemens Aktiengesellschaft, Munich (DE)

(72) Inventors: Thomas Hild, Frankfurt am Main (DE); Stefan Kern, Frankfurt am Main (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/210,744

(22) Filed: Mar. 24, 2021

(65) Prior Publication Data

US 2021/0314472 A1     Oct. 7, 2021

(30) Foreign Application Priority Data

Apr. 2, 2020   (DE) ................ 10 2020 204 311.6

(51) Int. Cl.
| | |
|---|---|
| *H04N 5/225* | (2006.01) |
| *G03B 15/05* | (2021.01) |
| *H04N 5/235* | (2006.01) |
| *H04N 5/238* | (2006.01) |
| *H02B 7/01* | (2006.01) |

(52) U.S. Cl.
CPC ......... *H04N 5/22521* (2018.08); *G03B 15/05* (2013.01); *H04N 5/2252* (2013.01); *H04N 5/2253* (2013.01); *H04N 5/238* (2013.01); *H04N 5/2354* (2013.01); *G03B 2215/0503* (2013.01); *G03B 2215/0567* (2013.01); *H02B 7/01* (2013.01); *H04N 2005/2255* (2013.01)

(58) Field of Classification Search
CPC ............. H04N 5/22521; H04N 5/2252; H04N 5/2253; H04N 5/2354; H04N 5/238; H04N 2005/2255; G03B 15/05; G03B 2215/0503; G03B 2215/0567; H02B 7/01
USPC .......................................................... 348/82
See application file for complete search history.

(56) References Cited

U.S. PATENT DOCUMENTS

| | | | |
|---|---|---|---|
| 3,966,297 A | | 6/1976 | Vigreux et al. |
| 5,751,444 A | * | 5/1998 | Ward .................... H04N 1/1017 358/474 |
| 6,501,572 B1 | | 12/2002 | Poth et al. |

(Continued)

FOREIGN PATENT DOCUMENTS

| | | |
|---|---|---|
| DE | 19653683 C1 | 6/1998 |
| DE | 29806211 U1 | 6/1998 |

(Continued)

OTHER PUBLICATIONS

German Office Action dated Apr. 11, 2020.

*Primary Examiner* — Joseph G Ustaris
*Assistant Examiner* — Matthew David Kim
(74) *Attorney, Agent, or Firm* — Harness, Dickey & Pierce, P.L.C.

(57) ABSTRACT

A camera is usable to observe a switched position of a switch contact of a switchgear apparatus. In an embodiment, the camera includes a light source to illuminate the switch contact, an image sensor, and a lens to focus light beams emanating from the switch contact onto the image sensor. In an embodiment, the camera additionally includes an elastic light protection cap to seal off a beam path, from the lens to the image sensor, from the light source in a lightproof manner.

13 Claims, 6 Drawing Sheets

(56) References Cited

U.S. PATENT DOCUMENTS

| | | | |
|---|---|---|---|
| 6,697,247 B1 | 2/2004 | Meinherz et al. | |
| 2005/0183636 A1 | 8/2005 | Klemm et al. | |
| 2015/0296146 A1* | 10/2015 | Scanlon | H04N 5/247 |
| | | | 348/82 |
| 2017/0045908 A1* | 2/2017 | Harms | H01H 13/06 |
| 2017/0214888 A1 | 7/2017 | Bai et al. | |
| 2019/0128365 A1* | 5/2019 | Hattori | F16F 13/06 |

FOREIGN PATENT DOCUMENTS

| | | |
|---|---|---|
| DE | 102004045256 A1 | 9/2005 |
| WO | WO 2007093575 A1 | 8/2007 |

* cited by examiner

CAMERA TO OBSERVE THE SWITCHED POSITION OF A SWITCH CONTACT

PRIORITY STATEMENT

The present application hereby claims priority under 35 U.S.C. § 119 to German patent application number DE 102020204311.6 filed Apr. 2, 2020, the entire contents of each of which are hereby incorporated herein by reference.

FIELD

Embodiments of the invention relates to a camera to observe the switched position of a switch contact.

BACKGROUND

For certification by UL (=Underwriters Laboratories, USA) or CSA Group (CSA=Canadian Standards Association), in the case of a switchgear apparatus for power distribution it is often necessary for the switched position of the switch contact to be able to be viewed. In the case of air-insulated switchgear (for short: AIS (=Air-Insulated Switchgear)) apparatuses, particularly in the case of outdoor apparatuses, the switched position of the switch contact can be inspected with the naked eye, without technical aids. For example, the isolating section that arises or is bridged during switching or grounding can be viewed in this case. In the case of gas-insulated switchgear (for short: GIS) apparatuses, the switch contact is situated in a hermetically sealed housing, usually in the form of a metallic encapsulation, which contains an insulating gas, e.g. sulfurhexafluoride SF6, and constitutes a barrier to the surroundings. This visual barrier can be overcome via an inspection window, e.g. having a pressure-resistant glass pane. Various commercially available solutions exist in respect of this.

If permitted by accessibility, the operator can view the switched position of the switch contact through an inspection window directly or via a mirror, see e.g. DE 29806211 U1 (Siemens AG) Jun. 4, 1998 or U.S. Pat. No. 3,966,297 A (Delle-Alsthom) Jun. 29, 1976. Since it is relatively dark in the interior of the hermetically sealed housing, a further window may be provided, through which the switching section is illuminated with the aid of a light source.

If there is no accessibility, a camera, in particular a video camera, can be used, see e.g. DE 19653683 C1 (Siemens AG) Jun. 18, 1998 and WO 2007093575 A1 (Siemens AG) Aug. 23, 2007. In this case, the current position of the switch contacts is transmitted to the operator as a live image, such that a clear visual detection of the current switched position of a switch contact of the switchgear apparatus, e.g. of a disconnecting or make-proof grounding switch, is possible.

SUMMARY

The inventors have discovered that in order to save costs, attempts are made to minimize both the number and the dimensions of the optical interfaces, e.g. of the inspection windows, with respect to the interior of the encapsulated switchgear apparatus. The inventors have discovered that with a compact design of the encapsulated switchgear apparatus having a single small window, the illumination of the switching section by way of a light source with simultaneous use of light-sensitive image sensors can lead to problems: the closer to the image sensor the light source is brought, the more stray light impinges on the image sensor and disturbs the image up to the point of being unrecognizable. Attempts are therefore made to optimize the distance between the light source and the image sensor in terms of the structural design.

At least one embodiment of the invention is to provide an improved camera to observe the switched position of a switch contact, in particular of an encapsulated switchgear apparatus.

At least one embodiment of the invention provides a camera to observe a switched position of a switch contact of a switchgear apparatus, the camera comprising:
a light source to illuminate the switch contact;
an image sensor;
a lens to focus light beams emanating from the switch contact onto the image sensor; and
an elastic light protection cap, to seal off a beam path, from the lens to the image sensor, from the light source in a lightproof manner.

BRIEF DESCRIPTION OF THE DRAWINGS

The above-described properties, features and advantages of this invention and the way in which they are achieved will become clearer and more clearly understood by virtue of the following description of the drawings. In this case, in a schematic illustration that is not true to scale.

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

In at least one embodiment, the camera serves to observe a switched position of a switch contact of a switchgear apparatus. In this case, the camera can be embodied as a video camera that transmits the recorded images live to a screen. The observation of the images recorded by the camera by an operator of the switchgear apparatus serves for inspection and monitoring of whether the switch contact is in a closed, i.e. current-conducting, or open, i.e. current-blocking, switched position.

In at least one embodiment, the switchgear apparatus can be a switchgear apparatus for power distribution. The switchgear apparatus can comprise single- or multi-pole, metal-encapsulated, compartmented or gas-insulated switch panels. In encapsulated and gas-insulated switchgear apparatuses, switch contacts, e.g. disconnecting switches, are combined with other elements such as busbars, circuit breakers and measuring devices in a switch panel and are no longer directly perceptible as an independent unit from outside. In particular, the switchgear apparatus can be a GIS apparatus, in which the switch contact is situated in a hermetically sealed housing, usually in the form of a metallic encapsulation.

A switch contact usually includes a first contact element arranged in a movable fashion relative to a second contact element. The two contact elements are pressed onto one another by a portion of their surfaces via an electromechanical actuation device, for example, by which the first contact element is moved, with the result that an electrically conductive connection is produced at the barrier of contact. The camera serves for optically capturing the view of the respective switched positions of the contact elements. If the switch contact is in an open switched position, the two contact elements are spaced apart from another by the switching section. When there is a change from the open switched position to the closed switched position, generally one of the two contact elements is moved through the switching section toward the other contact element. Observation of the switching section thus provides information about the switched position of a switch contact of the switchgear apparatus. The switch contact can be embodied as a disconnecting switch provided for producing a visible isolating section between live and disconnected parts of the apparatus.

The camera comprises an image sensor and a lens for focusing light beams emanating from the switch contact onto the image sensor. In the simplest case, the lens is a converging lens, e.g. composed of glass or plastic. Furthermore, the camera comprises a light source, which serves to illuminate the switch contact, since it is generally relatively dark in the interior of the switchgear apparatus without a light source. The light source is, in particular, an electrically operated light source, e.g. an incandescent lamp, a halogen lamp or preferably an LED (=Light Emitting Diode).

The camera comprises an elastic light protection cap, by which a beam path from the lens to the image sensor is sealed off from the light source in a lightproof manner. The light protection cap is thus an enclosure which encloses the beam path and which separates the beam path from the surroundings of the beam path in a lightproof manner. This ensures that only the light captured by the lens reaches the image sensor, and prevents stray light originating from other light sources from reaching the image sensor.

At least one embodiment of the invention is based on the insight that the object of avoiding stray light is achieved via an elastic light protection cap. By virtue of its elasticity, the light protection cap can be placed firstly against the lens, or a component of the camera enclosing the lens, and secondly against the image sensor, or a component of the camera enclosing the image sensor, so tightly that no light openings remain and the beam path running from the lens to the image sensor is sealed off from the light source in a lightproof manner.

In at least one embodiment, this affords at least one of the following advantages: stray light in the camera and in the surroundings of the image sensor is blocked very efficiently since the light protection cap includes lightproof material. Moreover, as a result of the beam path being sealed off in a lightproof manner, only a single light protection cap is required even when a plurality of light sources are used in the camera; by contrast, if each individual light source present in the camera were sealed off, a plurality of covering bodies or devices for protection against overexposure would be necessary.

The high elasticity and flexibility of the light protection cap likewise contributes to the fact that the manufacturing and mounting tolerances can be dimensioned generously, which reduces the production costs: large manufacturing and mounting tolerances are compensated for by the elastic properties of the light protection cap, and so relatively small tolerances are sufficient.

Advantageous configurations and developments of the invention are specified in the claims.

In accordance with one preferred development of an embodiment of the invention, the light protection cap includes an elastic and lightproof material having a hardness of 30 to 50 Shore A. In the event of compression of the light protection cap, owing to the low Shore hardness the reaction forces generated are so small that the components of the camera that adjoin the light protection cap do not have exerted on them any forces that result in a deformation of the geometry of the camera, e.g. owing to forces or distances that fluctuate at different temperatures, and thus in an impairment of the image quality. The focal distance between the lens and the image sensor thus remains constant, as a result of which the image remains sharp.

In accordance with one preferred development of an embodiment of the invention, the light protection cap includes EPDM (=Ethylene Propylene Diene rubber). What is advantageous here is that EPDM has a high thermal stability, i.e. allows use both at low and at high temperatures. Moreover, EPDM has long-term ageing stability and is simple to process. Typical applications for the material EPDM are therefore sealing elements, inter alia.

In accordance with one preferred development of the invention, the light protection cap includes silicone, in particular a silicone rubber or a silicone elastomer. What is advantageous here is that silicone has a high thermal stability, i.e. allows use both at low and at high temperatures. Moreover, silicone has long-term ageing stability and is simple to process. Typical applications for the material silicone are therefore sealing elements, inter alia.

In accordance with one preferred development of an embodiment of the invention, the light protection cap is embodied in the form of a tube having a double-C shape, in particular a rotationally symmetrical double-C shape, in section along its longitudinal axis. In the event of compression of the light protection cap caused by the application, owing to the double-C shape of the side walls of the tubular light protection cap the reaction forces generated are so small that the components of the camera that adjoin the light protection cap do not have exerted on them any forces that result in a deformation of the geometry of the camera, e.g. owing to forces or distances that fluctuate at different temperatures, and thus in an impairment of the image quality. The focal distance between the lens and the image sensor thus remains constant, as a result of which the image remains sharp. The double-C shape of the side walls of the tubular light protection cap ensures that the light protection cap is uniformly pressed firstly against the lens, or a component of the camera enclosing the lens, and secondly against the image sensor, or a component of the camera enclosing the image sensor, such that the beam path from the lens to the image sensor is sealed off from the light source in a lightproof manner. Gaps at which light from the light source could enter the beam path can thus be avoided. Height differences in the regions in which the light protection cap bears against the lens, or against a component of the camera enclosing the lens, and against the image sensor, or against a component of the camera enclosing the image sensor, can thus be effectively sealed off in a lightproof manner.

In accordance with one preferred development of an embodiment of the invention, the camera comprises a camera housing, which encloses the light source and the image sensor and receives the lens in a through opening of the camera housing. In this case, the light protection cap is embodied in a tubular fashion and bears by its first end against an inner wall of the camera housing and by its second end against a surface of a PCB, on which the light source and the image sensor are arranged. On account of the elasticity of the light protection cap, the compression of the light protection cap caused by the application, the mechanical stresses and thus the deformation between the PCB and the camera housing are very small. The focal distance between the lens, which is arranged on the camera housing, and the image sensor, which is situated on the PCB, thus remains constant, even at different temperatures, as a result of which the image remains sharp. On account of the elasticity of the light protection cap, the advantage is afforded, moreover, that the second end of the light protection cap bears in a lightproof manner against the surface of the PCB in which conductor tracks extend, as a result of which the space on the PCB can be used for conductor tracks, instead of conductor tracks being left unused, as is the practice in the case of conventional devices for protection against overexposure, in the regions in which the device for protection against overexposure bears against a PCB, in order to provide a planar surface.

In accordance with one preferred development of an embodiment of the invention, the light source is an SMD LED, i.e. an LED arranged directly on a PCB (SMD=Surface-Mounted Device). These SMD LEDs are secured on the PCB by the SMT method, wherein an optical waveguide composed of plastic, e.g. polymethyl methacrylate PMMA, can be provided, which guides the light beams of the SMD LED through the housing of the video camera toward the outside. Advantages of the SMD LED include both the reduced costs for fitting an SMD LED on a PCB and the large emission angle of the SMD LED, which contributes to uniform illumination of the encapsulated housing.

The use of an SMD LED results in lower production costs, since the PCB can be populated exclusively with SMD components, rather than, as in conventional cameras, a through-hole LED having to be arranged on the PCB by the THT or THR method. Moreover, a very compact design of the camera is possible as a result, since the image sensor and the SMD LED can be arranged very closely next to one another on the PCB.

In accordance with one preferred development of an embodiment of the invention, the image sensor is an SMT component. The use of an SMT image sensor results in lower production costs, since the PCB can be populated exclusively with SMD components, rather than, as in conventional cameras, a through hole image sensor having to be arranged on the PCB by the THT or THR method. Moreover, a very compact design of the camera is possible as a result, since the SMT image sensor and the other SMD components can be arranged very closely next to one another on the PCB.

Figure 1:
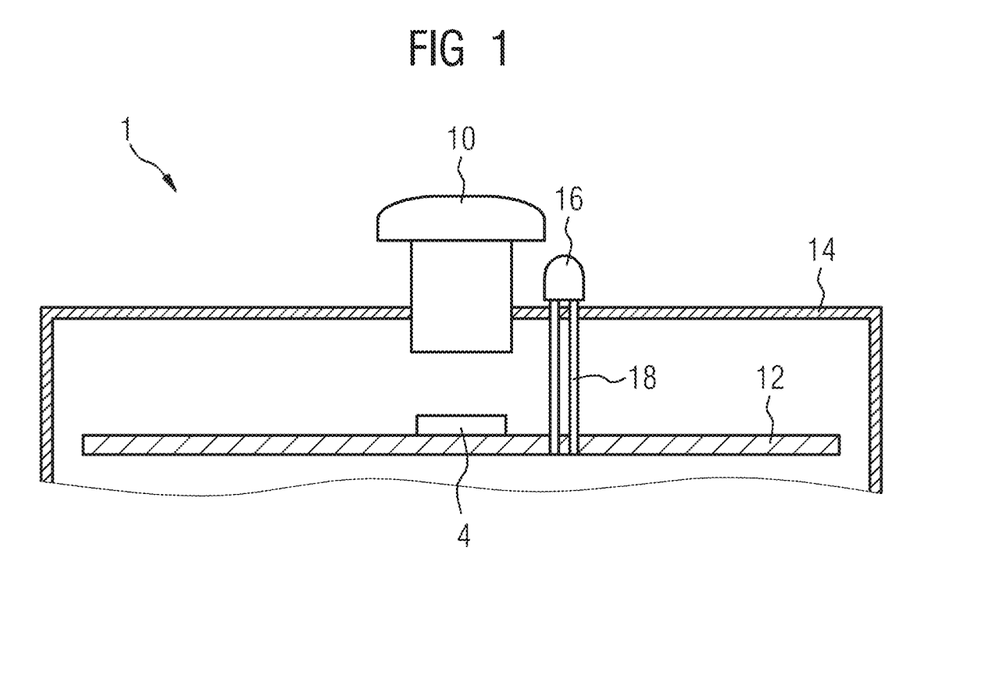
FIG. 1 shows a conventional video camera.

FIG. 1 shows a construction of a conventional video camera 1. In order to keep down the manufacturing costs of the video camera processor circuit boards, components are soldered directly onto the printed circuit board (PCB) via solderable connection areas using a surface-mounting technology (SMT), instead of being inserted into the PCB using older through-hole technology (THT). A further development of THT manufacturing is through-hole reflow technology (THR), which is more cost-effective than THT, but does not attain the efficiency of SMT. In the case of the video camera 1 illustrated, an image sensor 4 is installed on a PCB 12 via SMT. As light source, a so-called through-hole LED 16 is used, which can be attached only by the THT or THR method: a through-hole LED is distinguished by its wire connections 18, which during mounting are inserted into the PCB 12 through contact holes and are then soldered to the PCB 12. Constructions comprising a plurality of LED are also in use in order to ensure redundancy if one LED fails. The PCB 12 is at least partly surrounded by a light-nontransmissive camera housing 14 having an opening in a direction toward a switch contact to be observed, a lens 10, i.e. an optical converging lens, being arranged in the opening and focusing light beams incident on the lens 10 from the switch contact onto the image sensor 4. The light-emitting part of the through-hole LED 16 is arranged outside the camera housing 14 in order to be able to illuminate the switch contact. In this case, the connection wires 18 of the through-hole LED 16 run through the camera housing 14 to the PCB 12. Owing to the arrangement of the light source outside the camera housing 14, this arrangement being made possible by the long connection wires 18 of the through-hole LED 16, and owing to the lightproof camera housing 14, incidence of direct light from the LED 16 on the image sensor 4 is prevented. Moreover, as a result of the relatively small, forward directed emission angle, i.e. aperture angle, of the through-hole LED 16, relatively little stray light impinges on the lens 10 and from there on the image sensor 4.

However, the use of a through-hole LED 16 is relatively complex: the wire connections 18 have to be insulated in order to achieve the dielectric strength of secondary components that is necessary for switchgear apparatuses, here usually 2 kV. Moreover, owing to the wire connections 18 of the through-hole LED 16, manufacture on modern SMT machines is not possible. A further disadvantage is that even though it is relatively little, stray light nevertheless does still impinge on the image sensor 4, which reduces the light sensitivity and thus the image contrast. A further disadvantage of the through-hole LEDs is the small emission angle resulting in reflections at the metallic housing, as a result of which metallic objects are not visible in some instances.

A different manufacturing variant in the case of modern video cameras for observing a switch contact is the use of SMD LEDs as light source. The SMD LEDs are secured on the PCB by the SMT method, and an optical waveguide composed of plastic, e.g. polymethyl methacrylate PMMA, guides the light beams of the SMD LED through the housing of the video camera toward the outside. What are advantageous here are both the reduced manufacturing costs and the large emission angle of the SMD LED, which contributes to uniform illumination of the encapsulated housing.

Figure 2:
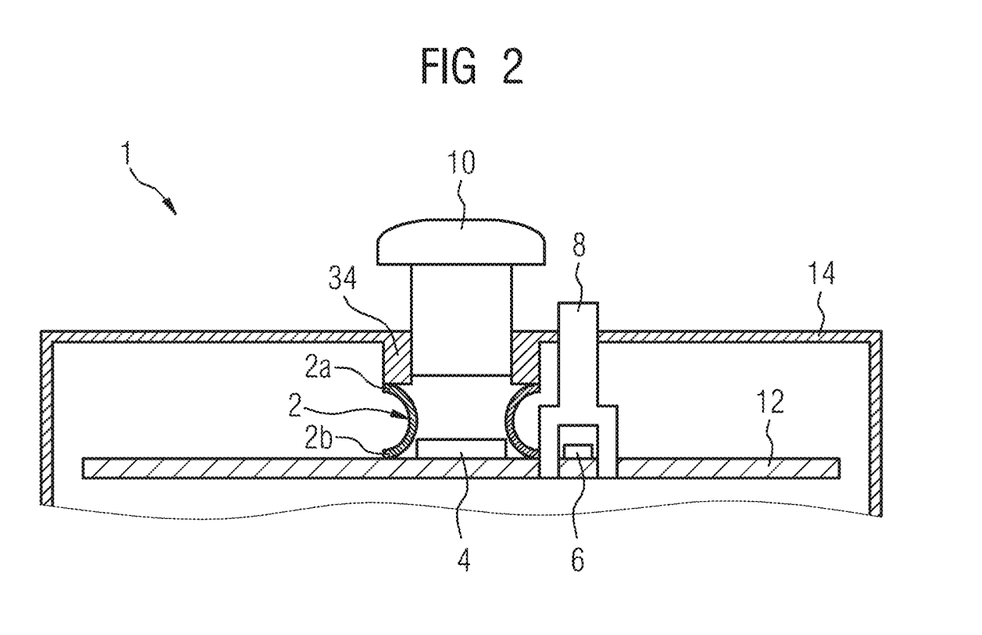
FIG. 2 shows a video camera according to an embodiment of the invention.

FIG. 2 shows a video camera 1 according to the invention. An SMT image sensor 4 and an SMD LED 6 are arranged on a PCB 12. The PCB 12 is at least partly surrounded by a light-nontransmissive camera housing 14, e.g. composed of metal or plastic, which has an opening provided with an edge 34 in a direction toward a switch contact to be observed, a lens 10 being arranged in the opening and focusing light beams incident on the lens 10 from the switch contact onto the image sensor 4. The light of the SMD LED 6 is guided via an optical waveguide 8 through the interior of the camera housing 14 and the wall of the camera housing 14 toward the outside of the camera housing 14 such that the switch contact to be observed is illuminated.

A light protection cap 2 embodied in a tubular fashion and composed of an elastic, lightproof, electrically nonconductive material, e.g. EPDM, silicone rubber or silicone elastomer, bears by its first end 2a against an inner wall of the camera housing 14, the inner wall forming the edge 34, and by its second end 2b against a surface of the PCB 12. In this way, a beam path from the lens 10 to the image sensor 4 is sealed off from the SMD LED 6 in a lightproof manner by the light protection cap 2 in order to avoid stray light on the image sensor 4. The light protection cap 2 simultaneously compensates for the manufacturing and mounting tolerances of the PCB 12 and of the camera housing 14 which lead to light gaps and thus stray light.

Figure 3:
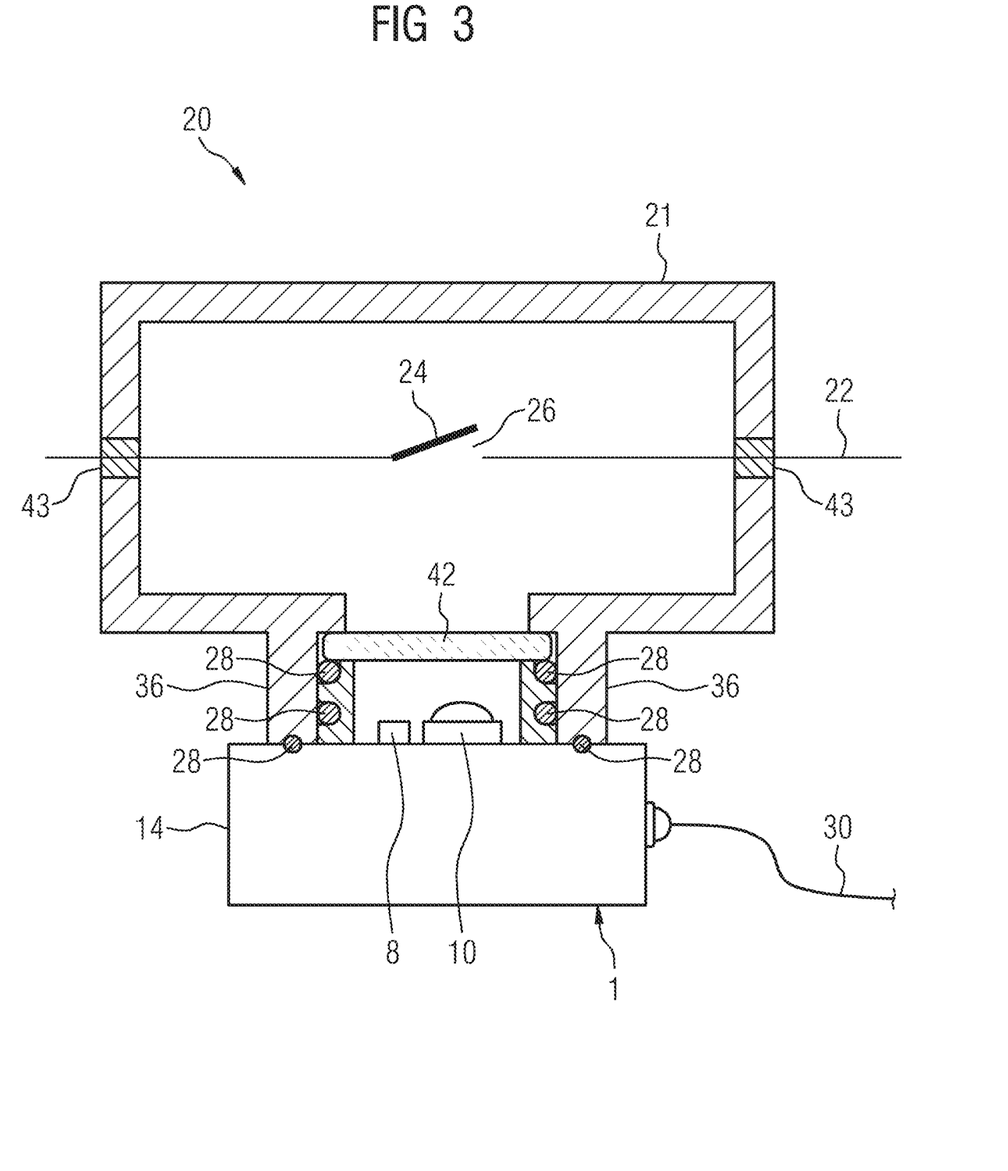
FIG. 3 shows a switchgear apparatus.

FIG. 3 shows a switchgear apparatus 20 comprising a metallic encapsulation 21 filled with insulating gas and a switch contact 24 arranged in the encapsulation 21, for switching a current conductor 22 led through the encapsulation 21 in a gas-tight manner with the aid of two bushings 43. The switchgear apparatus 20 additionally comprises a video camera 1, the housing 14 of which is fixed to a flange 36 of the encapsulation 21.

The camera 1 is configured such that an optical waveguide 8, which guides light of an SMT LED 6 toward the outside of the camera housing 14, illuminates the switching section 26 to be observed of the switch contact 24, since it is relatively dark in the interior of the hermetically sealed encapsulation 21. The camera 1 is additionally configured such that light incident on a lens 10 of the camera 1 from the switching section 26 of the switch contact 24 is focused onto an image sensor of the camera 1. With regard to the internal construction of the camera 1, reference is made to FIG. 2.

The optical waveguide 8 and the lens 10 of the camera 1, which are both arranged on the camera housing 14, are separated from the interior of the encapsulation 21 in a gas-tight manner by an observation window 42 bearing against the flange 36 and by seals 28 extending peripherally along the flange 36. Owing to the use of the observation window 42, which can consist of borosilicate glass or acrylic glass, for example, no gas escapes from the encapsulation 21 when the camera 1 is exchanged—the electronic components of the camera 1 generally have to be maintained or exchanged more often than the switchgear apparatus 20.

The optical waveguide 8 and the lens 10 of the camera 1 are sealed off from the surroundings of the switchgear apparatus 20 in a dust-tight manner via a seal 28 inserted between the flange 36 and the camera housing 14.

Figure 4:
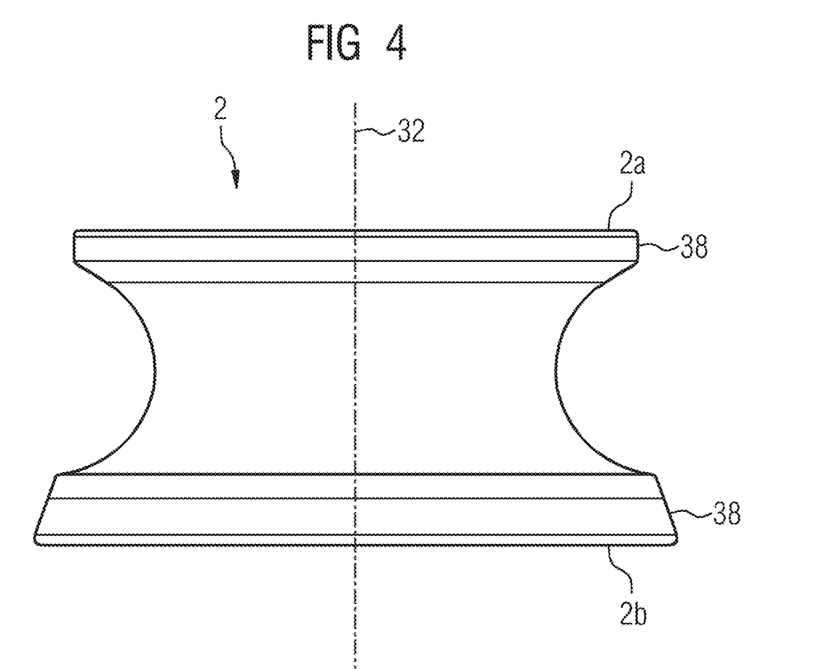
FIG. 4 shows a side view of a light protection cap.

FIG. 4 shows a side view of a light protection cap 2. The light protection cap 2 embodied in a tubular fashion includes an elastic, lightproof, electrically nonconductive material. The light protection cap 2, which is shaped rotationally symmetrically with respect to its longitudinal axis 32, has a first end 2a and a second end 2b. Between the two ends 2a, 2b the light protection cap is shaped such that the outer contour of the light protection cap runs arcuately concavely, i.e. in a C-shaped fashion. The tubular interior of the light protection cap 2 running from the first end 2a to the second end 2b is embodied such that therein a beam path running from a lens arranged at the first end 2a to an image sensor arranged at the second end 2b is sealed off from a light source arranged outside in a lightproof manner.

The lips 38 arranged at the first end 2a and at the second end 2b of the light protection cap 2 are so elastic that they can nestle against components of a camera, such as a PCB and an inner wall of a camera housing, in a lightproof manner.

Figure 5:
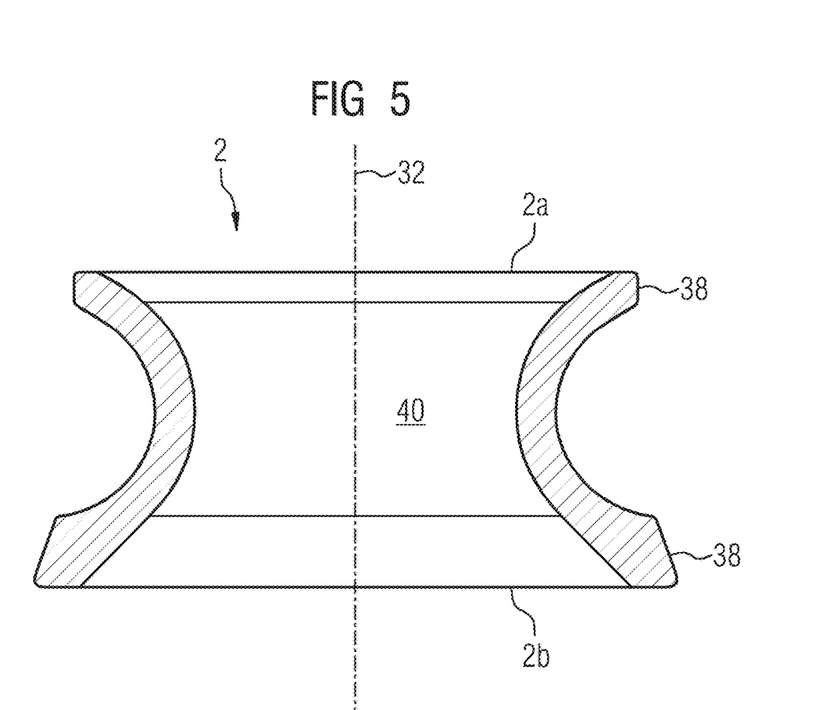
FIG. 5 shows a section through the light protection cap from FIG. 5.

FIG. 5 shows a section through the light protection cap 2 illustrated in FIG. 4. The light protection cap 2, which is shaped rotationally symmetrically with respect to its longitudinal axis 32, has a first end 2a with a lip 38 and a second end 2b with a lip 38. Between the two ends 2a, 2b the light protection cap is shaped such that the outer contour of the light protection cap 2 runs arcuately concavely, i.e. in a C-shaped fashion. The section shows the tubular interior 40 of the light protection cap 2 running from the first end 2a to the second end 2b.

Figure 6:
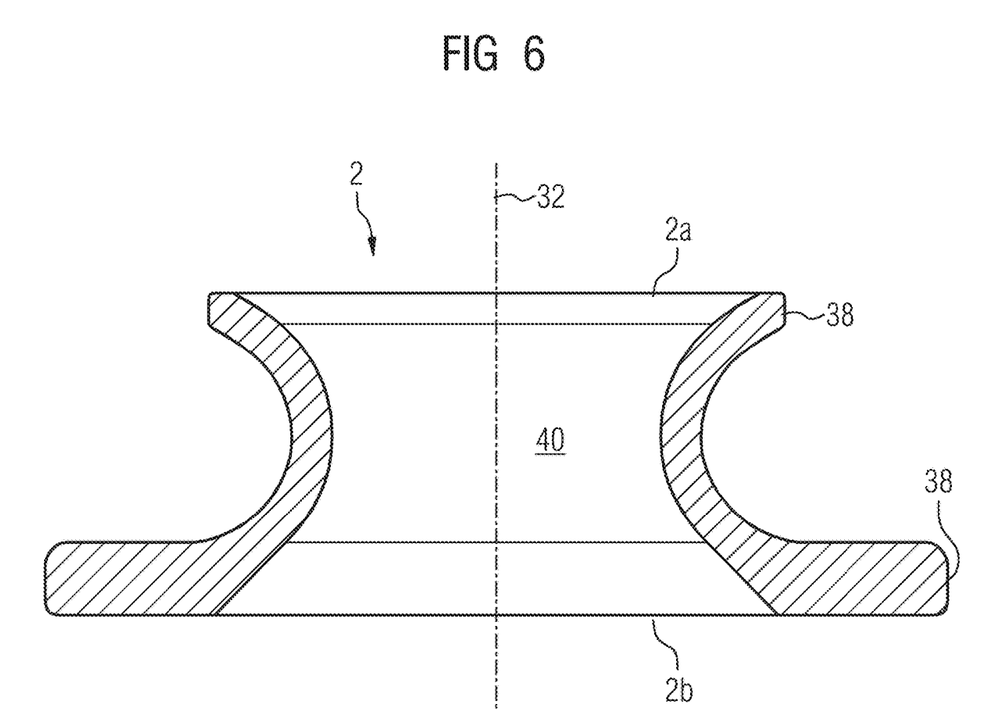
FIG. 6 shows a section through a second light protection cap.

FIG. 6 shows a section through a second light protection cap. The light protection cap 2, which is shaped rotationally symmetrically with respect to its longitudinal axis 32, has a first end 2a with a lip 38 and a second end 2b with a lip 38. Between the two ends 2a, 2b the light protection cap is shaped such that the outer contour of the light protection cap 2 runs arcuately concavely, i.e. in a C-shaped fashion. The section also shows the tubular interior 40 of the light protection cap 2 running from the first end 2a to the second end 2b.

Figure 7:
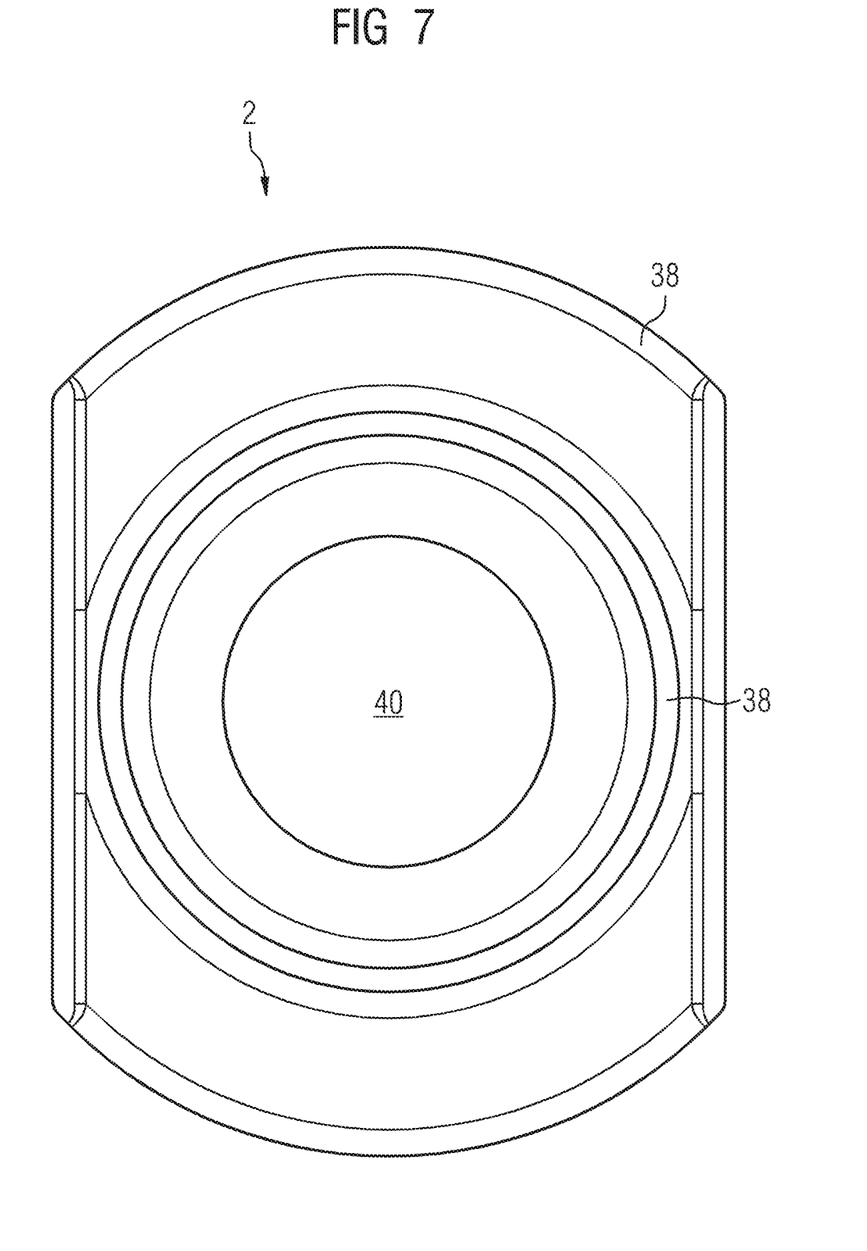
FIG. 7 shows a plan view of the light protection cap from FIG. 6.

FIG. 7 shows a plan view of the light protection cap 2 illustrated in FIG. 6. The plan view reveals the tubular interior 40 of the light protection cap 2 running from the first end 2a to the second end 2b.

Figure 8:
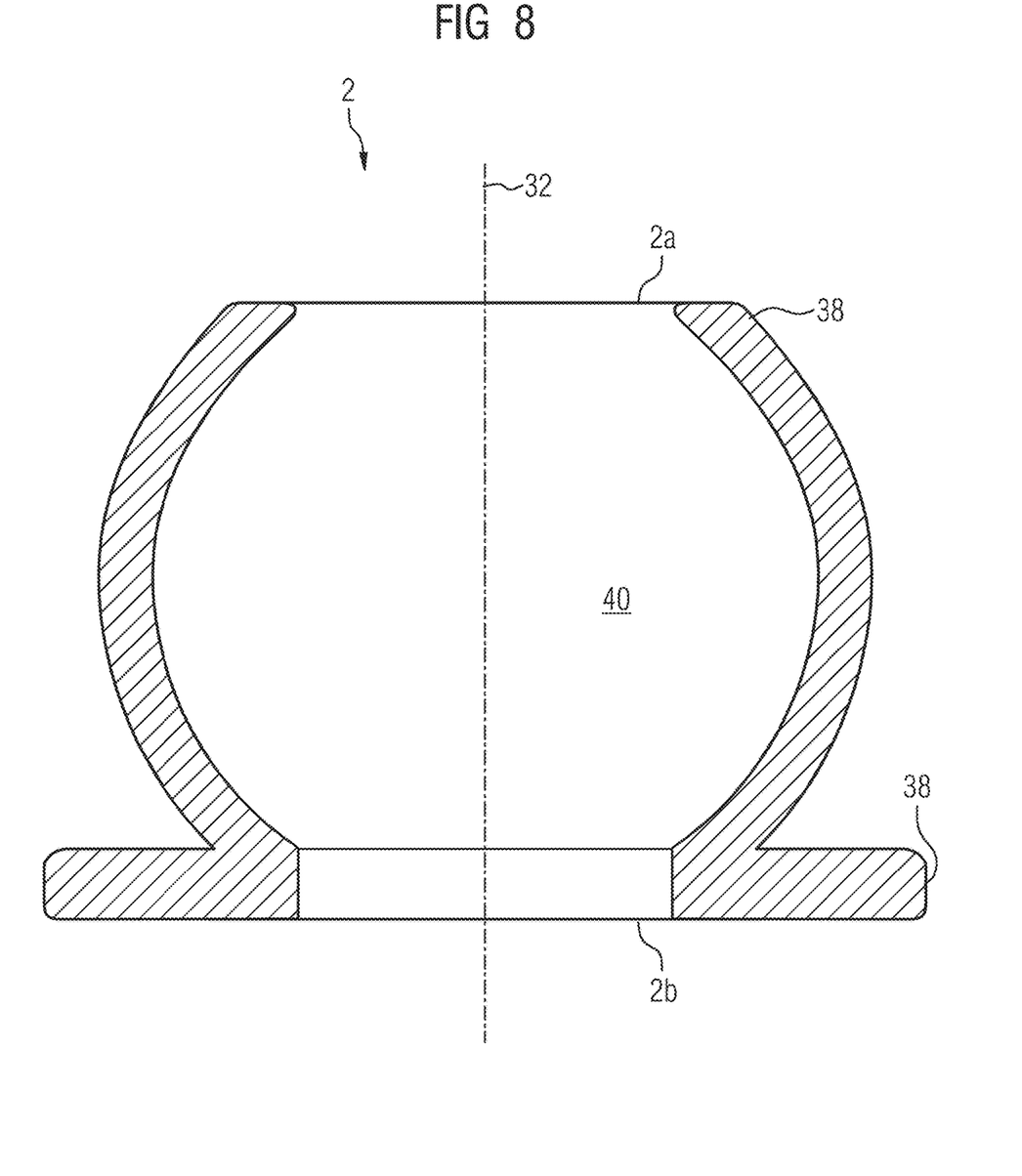
FIG. 8 shows a section through a third light protection cap.

FIG. 8 shows a section through a third light protection cap. In contrast to the light protection caps illustrated in FIGS. 5 and 6, the light protection cap 2 illustrated in FIG. 8 has an outer contour which indeed likewise runs in a C-shaped fashion, but arcuately convexly.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A camera to observe a switched position of a switch contact of a switchgear apparatus, the camera comprising:
    a light source to illuminate the switch contact;
    an image sensor;
    a lens to focus light beams emanating from the switch contact onto the image sensor;
    an elastic light protection cap, to seal off a beam path, from the lens to the image sensor, from the light source in a lightproof manner; and
    a camera housing, enclosing the light source and the image sensor, wherein the lens is received in a through opening of the camera housing, wherein the light protection cap is embodied in a tubular fashion and bears by a first end of the light protection cap against an inner wall of the camera housing and by a second end of the light protection cap against a surface of a printed circuit board (PCB), the light source and the image sensor being arranged on the PCB, wherein the light protection cap is embodied in a form of a tube having a double-C shape in section along a longitudinal axis of the tube.

2. The camera of claim 1, wherein the light protection cap includes an elastic and lightproof material having a hardness of 30 to 50 Shore A.

3. The camera of claim 2, wherein the light protection cap includes EPDM or silicone.

4. The camera of claim 2, wherein the light protection cap is embodied in a form of a tube having a double-C shape in section along a longitudinal axis of the tube.

5. The camera of claim 2, wherein the light source is an SMD LED.

6. The camera of claim 2, wherein the image sensor is an SMT component.

7. The camera of claim 1, wherein the light protection cap includes EPDM or silicone.

8. The camera of claim 7, wherein the light source is an SMD LED.

9. The camera of claim 7, wherein the image sensor is an SMT component.

10. The camera of claim 1, wherein the light source is an SMD LED.

11. The camera of claim 10, wherein the image sensor is an SMT component.

12. The camera of claim 1, wherein the image sensor is an SMT component.

13. A camera to observe a switched position of a switch contact of a switchgear apparatus, the camera comprising:
    a light source to illuminate the switch contact;
    an image sensor;
    a lens to focus light beams emanating from the switch contact onto the image sensor; and
    an elastic light protection cap, to seal off a beam path, from the lens to the image sensor, from the light source in a lightproof manner, wherein the elastic light protection cap is embodied in a form of a tube having a double-C shape in section along a longitudinal axis of the tube.

* * * * *